Patented Oct. 16, 1951

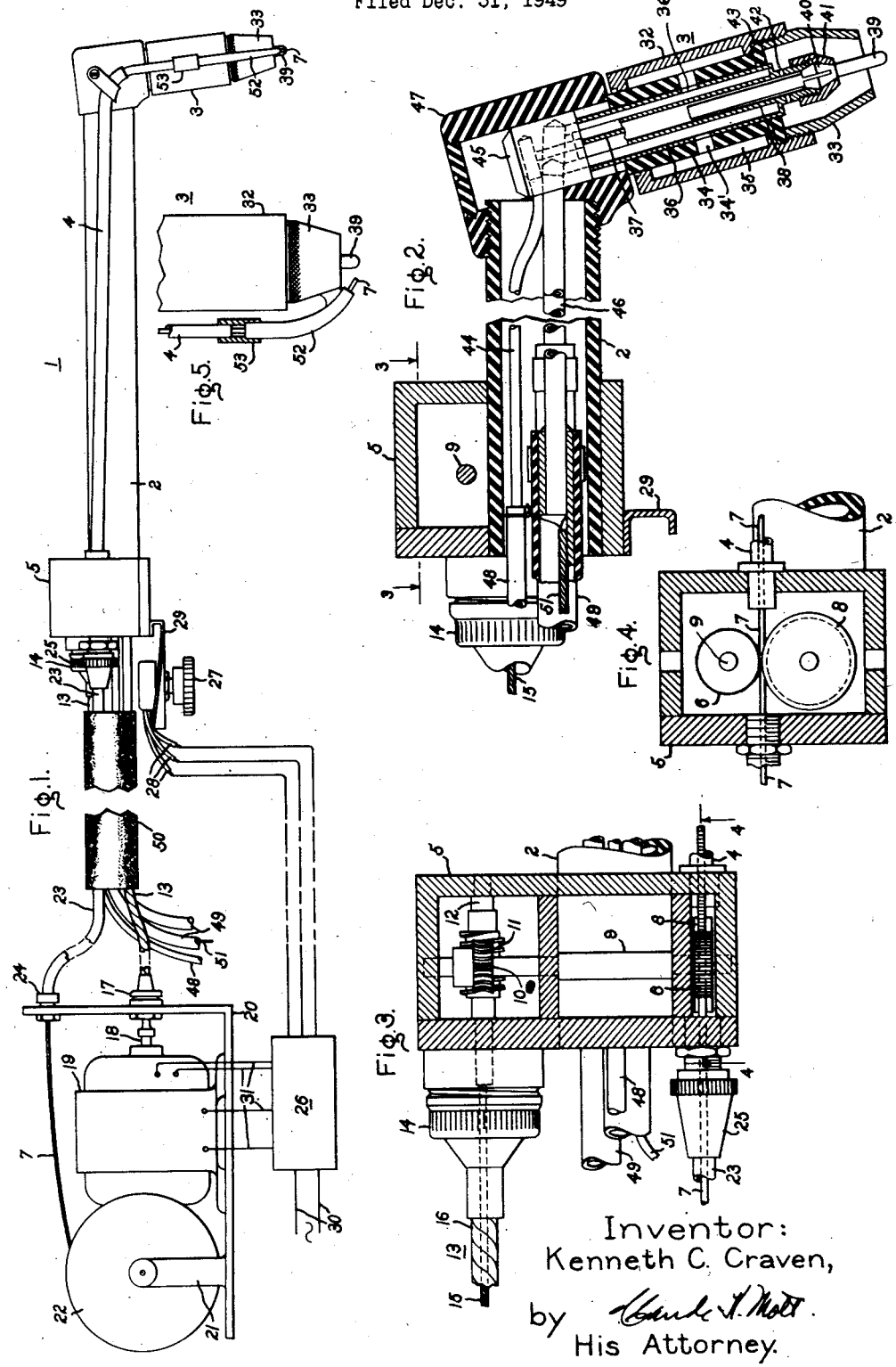

2,571,684

UNITED STATES PATENT OFFICE 2,571,684

GAS SHIELDED ARC WELDING TORCH

Kenneth C. Craven, Fitchburg, Mass., assignor to General Electric Company, a corporation of New York Application December 31, 1949, Serial No. 136,247

7 Claims. (Cl. 219—8)

My invention relates to apparatus for automatically feeding to the welding agency at the tip of a hand torch a filler wire which is fused and added to the weld formed by traversing the torch along the parts being welded. More particularly, my invention relates to an improved hand torch forming part of such apparatus.

When welding together thin sheets of metal, it is possible to place their mating edge portions in contact with one another and join them with a fusion weld of substantially the same thickness as the sheets without adding additional metal to the weld. For thicker sheets it is possible to turn up their abutting edge portions to provide additional metal which is fused to form a weld of the same or greater thickness than the sheets. There are, however, many occasions for supplying additional fused metal to the fused metal of the work parts being welded in order to form a weld of the desired thickness. For example, when the edge portions of the work parts do not make a tight point or when welding thick metal parts requiring a groove along their edge portions, it is necessary to supply additional metal to the weld and this is most generally accomplished by fusing off the end of a filler rod or wire by the same heating agency which is employed for rendering the work parts molten in the formation of the weld. For most hand welding operations, the operator holds the welding torch in one hand and feeds a filler wire or rod into the weld with his other hand. This requires considerable coordination on the part of the welder to manipulate the filler wire and welding torch properly to produce a weld of good appearance and sound structure.

It has already been proposed to provide hand torches and fully automatic apparatus for feeding into the weld filler wire which is to be added thereto. The arrangements heretofore proposed, however, have not provided in hand torches the freedom of movement and unobstructed visibility required in certain welding operations. Furthermore, hand torches proposed for this purpose do not have the desired balance and streamlining which makes it possible for the operator to manipulate them without excessive fatigue.

Any suitable type of torch or automatic machine may be used in making a weld which is enlarged by adding fused filler wire thereto. This includes gas welding apparatus, arc welding apparatus, and gas-arc welding apparatus particularly of the type in which the arc and molten portions of the work are shielded by a protective gas from the action of the surrounding atmosphere.

When fusion welding certain metals and particularly aluminum and its alloys, it has been found that the most desirable welds are produced when using inert arc welding apparatus. Such apparatus provides means for establishing an arc between a tungsten electrode and the work in a shielding atmosphere of an inert gas such as argon, helium, or mixtures of these gases. Fusion welds of high quality and desirable characteristics may be produced with such apparatus without the use of fluxes, and consequently the weld is in no way deteriorated by the residue of those fluxes, which must be used when performing such welding operations with other types of apparatus.

It is an object of my invention to provide a hand torch of improved construction which forms part of an apparatus for automatically feeding filler wire to the welding agency formed at the tip of the welding torch.

It is a further object of my invention to provide a balanced streamlined hand torch of the character described, which permits the operator greater freedom of movement and greater visibility than attainable with torch constructions heretofore proposed.

It is also an object of my invention to provide a hand torch of the gas-arc type which embodies wire feeding mechanism for supplying filler wire to the arcing terminal of the electrode of such torch without unduly complicating the structure and balance of the torch which must also accommodate means for supplying gas and electricity to its nozzle portion and suitable cooling means to prevent overheating thereof.

The novel features which I believe to be characteristic of my invention are set forth with particularity in the appended claims. The invention itself, together with further objects and advantages thereof can best be understood by reference to the following description taken in connection with the accompanying drawing in which Fig. 1 shows one embodiment of my improved welding torch and the parts associated therewith to form the complete apparatus. Fig. 2 of this drawing is a sectional view of portions of the welding torch of Fig. 1 showing its internal construction, Fig. 3 is a further detailed view showing the construction of the torch as viewed along section line 3—3 of Fig. 2, and Fig. 4 is a further detailed view of the torch of Fig. 1 taken along section line 4—4 of Fig. 3. Fig. 5 is a view showing the arrangement employed for supporting the end of the wire guide on the replaceable tip portion of the torch of Fig. 1 whereby worn tips may be replaced or other tips substituted in accordance with the size of the weld to be performed with such torch.

The gas-arch hand torch 1 shown in Fig. 1 of the drawing comprises a handle 2 which supports at its front end portion an angularly disposed nozzle 3. Filler wire is fed to the fusing agency at the tip of the torch through a wire guide 4 which extends along the outside surface of the handle 2 and nozzle 3 thereof. It will be noted that this wire guide conforms to the contour of the torch and does not interfere with its inherent structure or hinder the view of the welding operator who is performing a welding operation with this torch. The inner end of the wire guide 4 is connected to the front side wall of an enclosure 5 which contains a wire feeding mechanism. This enclosure and the wire feeding mechanism therein is mounted on the rear end portion of the torch handle 2 and acts as a counterbalance for the head or nozzle portion of the torch.

The structure of the feeding mechanism in enclosure 5 is shown in Figs. 3 and 4. It comprises a feed wheel 6 having a knurled surface which engages the filler wire 7 which is held in position relative to the feed wheel 6 by a guide wheel 8 having a grooved periphery. The guide wheel 8 is supported within the enclosure 5 by means of a shaft and is free to turn as required by the passage of the filler wire 7 along its periphery. The feed wheel 6 is mounted on and driven by a shaft 9 also journaled by suitable supports within the enclosure 5. The other end of this shaft is provided with a worm wheel 10, which meshes with and is driven by a worm 11 mounted on a shaft 12 also journaled in the walls of the enclosure and one end of which extends through the enclosure for connection with one end of a flexible shaft 13 connected therewith and to the adjacent external wall of the enclosure 5 by means of a coupling 14. The flexible shaft 13 may be of any suitable type and has been illustrated as having a rotatable wire wound core 15 and a stationary outer casing or covering 16. As shown in Fig. 1, the other end of the flexible shaft 13 is connected by means of a coupling 17 to the rotating shaft 18 of a drive motor 19. This drive motor is mounted on a support 20, the upturned end portion of which also serves as a mounting for the coupling 17 of this flexible shaft.

Also mounted on the support 20 in a bracket 21 is a reel 22 upon which is coiled the filler wire 7 which is drawn from the reel and guided through a flexible wire guide 23 to the feeding mechanism within enclosure 5 mounted on the torch handle. One end of the flexible wire guide 23 is mounted on the upturned end portion of support 20 through the agency of a coupling 24 and its other end is mounted on the rear side wall of the enclosure 5 through the agency of a coupling 25. The flexible wire guide 23 may be made of any suitable material. I have used a flexible tube of polyvinylidene chloride plastic which is available on the market under the trade name of "Saran." It will be noted that the arrangement is such that the filler wire 7 is withdrawn from reel 22 and directed by flexible wire guide 23 to the driving wheel 6 of the feeding mechanism within the enclosure 5 from which it is fed to the discharge end of the wire guide 4 supported on and forming a part of the hand torch 1.

The filler wire 7 is fed at a substantially constant rate of speed which may be adjusted by a suitable speed control 26 for the motor 19. This speed control may be of any suitable type and is located remotely from the torch 1 except for an adjusting element 27 thereof which is mounted on the torch and connected with the remainder of the control through flexible members 28. In the arrangement indicated in the drawing, an electric controller has been shown for the electric feed motor 19 and the adjusting element 27 is a potentiometer electrically connected with the remainder of the controller 26 through the flexible electric conductors 28. The potentiometer 27 may be supported on the torch by means of a bracket 29 which is attached to the enclosure 5 for the feeding mechanism.

The speed controller 26 may be of the type known to the trade as a "Thy-Mo-Trol" drive. Since it is not necessary to reverse the directions of wire feed, a non-reversing control may be used. As known by those skilled in the art, this comprises a controlled arc discharge device of the gaseous type having its anode-cathode circuit connected in series with the armature circuit of the controlled motor to a source of alternating current supply. The control-element-to-cathode circuit of this electric valve may include a phase shift circuit, an adjustable voltage derived from a potentiometer, a negative bias voltage and the back electromotive force voltage of the armature of the motor being controlled. By setting the potentiometer for a value of voltage which is balanced against the back electromotive force of the motor, the current supplied to the motor is suitably controlled to hold a speed determined by this adjustment of the potentiometer. The shunt field of the motor in such controls is usually supplied with direct current derived from the alternating current source of supply through a full wave rectifier forming part of the control. In Fig. 1 of the drawing the alternating current supply conductors for the control 26 have been illustrated at 30 and the armature and field circuit conductors for the motor 19 have been illustrated at 31.

The hand torch 1 shown in the drawing is of the gas-arc type and embodies a construction forming the subject matter of application Serial No. 100,984, Roger W. Tuthill and Alanson U. Welch, Jr., for Fluid Cooled Welding Apparatus, filed June 24, 1949, assigned to the assignee of this invention, and on which United States Letters Patent 2,527,235 was granted on October 24, 1950.

It comprises, as previously stated, a nozzle 3, angularly disposed at the end of a handle 2. This nozzle has a body portion 32 and a replaceable tip portion 33 which in the arrangement illustrated makes a threaded engagement with and is supported by the lower edge portion of the body portion 32 of the nozzle. The body portion 32 of the nozzle frictionally engages a resilient sleeve 34 from which internal portions are spaced to form a cooling fluid passageway 35. This sleeve 34 frictionally engages a cylindrical member 36 which is divided longitudinally by two spaced strips 37 interposed between the internal side wall of member 36 and the external side wall of the cylindrical portion 38 of the electrode holder. Cooling fluid within the longitudinally extending passageway formed by strips 37 between members 36 and 38, is supplied through openings 36' in the side wall of member 36 and matching openings 34' in the sleeve 34 to the cooling passageway 35 extending around the internal surface of the body portion 32 of the nozzle. Except for the sleeve 34, which is formed of an electrically insulating material such as rubber, the parts above mentioned are made of metal and the cooling fluid consequently effectively prevents overheating of the nozzle and of the electrode holder. The sleeve 34 also electrically insulates the nozzle from the electric current conducting portions of the torch which will now be described.

The cylindrical portion 38 of the electrode holder accommodates the upper end of an electrode 39 which is held in an adjusted position relative thereto by a collet clamp comprising a collet member 40 and a sleeve 41 threaded to the lower portion of the electrode holder and provided with a tapered surface for the collet member 40 which also engages a tapered surface on the lower end of the member 38. Gas is supplied through member 38 and discharged through openings 42 into the tip portion of the nozzle 3. A gas tight connection is provided between the tip portion of the nozzle and the body portion thereof by means of a resilient heat resisting washer 43 which is formed of electrically insulating material and is seated against a shouldered portion of the nozzle body portion 32 so as to be engaged by the inner end of the tip portion 33 of the nozzle which forms a threaded engagement with the lower end of the body portion of the nozzle.

Gas is supplied to the electrode holder portion 38 by a pipe 44 which extends lengthwise of the torch handle 2 and is connected therewith through a passageway in a coupling 45. This coupling 45 also provides connections between the supply and exhaust cooling fluid passageways in the nozzle and the supply and exhaust cooling fluid pipes 46 extending lengthwise of the torch handle. These pipes may be made of metal and thus carry away additional heat from the torch. The coupling 45 is enclosed by a cap of electrically insulating material 47 which is attached to the outer end of the torch handle 2 which is also made of electrically insulating material. Gas pipe 44 and cooling fluid pipes 46 are respectively connected at their inner ends with a flexible gas hose 48 and flexible cooling fluid hoses 49. These hoses are preferably made of rubber and extend from the rear portion of the torch handle. They are enclosed along with the flexible drive shaft 13 and the flexible wire guide 23 in a common sheath 50. An electric conductor 51 extends from one terminal of a suitable source of electric current through one of the hoses 49 to one of the metal pipes 46 to which it is connected and by means of which current is supplied to the metallic electrode holder in the nozzle 3 of the torch.

The tip portion 33 of the nozzle as previously stated is made replaceable so as to provide different sizes of tips for different sizes of electrodes and for replacement when worn out. The wire guide 4, however, has its terminal portion supported on and integral with this tip portion of the torch and it is consequently necessary to provide an arrangement whereby the tip portions of the nozzle and the terminal portion of this wire guide 4 may be removed. Such an arrangement has been illustrated in Figs. 1 and 5, and comprises a wire deflecting member 52 forming the terminal portion of the wire guide 4 to the body portion of which it is connected by a coupling 53. This coupling may be slid up on to the body portion of the wire guide 4 to permit rotation of the deflecting member 52 as required when unscrewing the tip portion 33 of the nozzle from its body portion 32. This coupling also constitutes a heat break so that very little heat will travel back along the wire guide 4 to the handle portion 2 of the torch which is held by the operator. The fluid cooled nozzle 3 effectively maintains the operating temperature of the deflecting member 52 of the wire guide 4 at a comparatively low temperature so that the heat of the arc and heat running back from the fusing end of the filler wire 7 does not produce a destructive temperature in the deflecting member 52 of the wire guide 4. This cooling feature, assisted by the heat break at coupling 53, also insures that the temperature of the body portion of the wire guide 4 extending along the handle of the torch will not become uncomfortable in the hand of the welder.

It will be noted that the terminal portion of the wire guide formed by the deflecting member 52 is curved inwardly to direct the filler wire 7 toward a point slightly below the end of the electrode 39 and at an acute angle to the work which will be below the electrode. Also, it is to be noted that this wire guide is curved in one plane to conform to the angle between the handle 2 and the nozzle 3 of the torch and is curved at the deflecting member in a plane substantially at right angles to the plane of the first mentioned curve. Due to this arrangement, the filler wire fed through the wire guide 4 is straightened as it passes around these sharp curves which are angularly disposed relative to one another. This materially assists in providing a uniform fusing rate and a uniform positioning relative to the arc of the fusing end of the filler wire which is desirable in order to secure uniform welding conditions which will produce a smooth bead of weld material which is of proper contour.

It is also apparent from what has been stated above that the various parts of the torch are by the construction illustrated effectively streamlined and that the addition or wire guide 4 thereto has in no way interfered therewith or with the visibility afforded the operator. Furthermore, the torch may be placed in restricted places with convenience and without interference from the wire guide used in supplying the filler wire. Also, since the wire guide 4 and nozzle 3 are electrically insulated from the electrode and its holder, the exterior of the torch may accidently touch the work parts without arcing thereto and shunting the arc. By placing the feeding mechanism in an enclosure 5 on the rear end of the handle of the torch, it effectively counterbalances the weight of the nozzle portion of the torch and is thus effective in securing the desired balance of the torch. Also, by placing the feeding mechanism on the torch, a wire of very small diameter may be successfully fed through the guide provided therefor and this is of importance for reasons noted below.

In using the torch above described, the operator establishes a gas shielded welding arc to secure a gas shielded pool of molten metal in the work and then initiates and controls the rate of feed of the filler wire. This can be done by operating the speed control element 27 mounted on the torch although it is preferable to use this only as a speed adjusting means and to provide a relay for starting and stopping the feed motor in response to the establishment of the arc. Preferably the starting of the drive motor should be delayed for a short interval of time after the arc has been established so that the heretofore mentioned pool of molten metal may be formed in the work. The torch is then traversed along the line of welding in the work to produce the weld which is formed by solidification of the fused metal of the work and of the filler wire fed thereto.

The rate at which the filler wire is fed to the arc is of great importance. I also attach great importance to the use of a filler wire of small diameter, preferably about one-sixteenth inch. Such a wire should be fed at a substantially uniform rate of speed equal to the rate at which fusion travels back along the filler wire due to the heat of the arc, so as to maintain the fusing end of the filler wire substantially stationary relative to the arc. If the speed adjustment is correct the filler wire will disappear where it engages the arc. It may be that a substantial amount of the filler wire is vaporized or formed into exceedingly small globules, thereby accounting for this disappearance of the filler wire in the arc. If the filler wire is fed at too slow a rate of speed, the fusing end of the filler wire will intermittently recede from the arc due to the formations of large globules of molten metal at its end and this will result in an uneven supply of fused metal to the weld and a weld bead of non-uniform cross section. It is even possible that under some circumstances attendant upon this formation of large globules of molten metal there will be such a discontinuity of filler wire material as to produce an uneven and porous weld. On the other hand, if the feeding rate of the filler wire is too great, its fusing end will intermittently cross the arc zone and be fused by the arc irregularly so that unfused portions of the filler wire will fall into the zone of fusion in the work and again produce an unsatisfactory weld having surface irregularities formed by the unfused portions of the filler wire. If the feeding speed is somewhere between these extremes and preferably such as to hold the fusing end of the filler wire substantially stationary relative to the arc, a sound bead of excellent quality having a desired uniform cross section and smooth surface will be formed.

Since the filler wire is fed in accordance with its rate of fusion, this speed of feeding will in large measure depend upon the buildup of heat at the point of welding. Consequently, for an arc of a given current value, the feeding rate will be slower when welding thick metal parts having a considerable amount of heat storage and heat radiating capacity. Also, since the current value of the arc will be changed in accordance with the thickness of the parts being welded, this will also control the rate of wire feed. A few examples will be sufficient to demonstrate this point. When welding aluminum plates one and one-half inches thick and having beveled portions at the seam with a 400 ampere arc, an aluminum filler wire of one-sixteenth inch diameter may be fed at 71 inches per minute, whereas when welding one-quarter inch aluminum plates also with beveled edges and the same 400 ampere arc, the aluminum filler wire may be fed at 100 inches per minute. Quarter inch aluminum plates may be welded by using a 380 ampere arc with a one-sixteenth inch aluminum filler wire fed at 48 inches per minute and one-eighth inch plates may be welded by using a 240 ampere arc with a one-sixteenth inch aluminum filler wire fed at 47 inches per minute.

Apparatus embodying my invention may be used for welding other metals beside aluminum, and consequently, the use of my apparatus is not to be interpreted as limited to the welding of aluminum and its alloys. For example, excellent results have been obtained when welding stainless steel using a stainless steel filler wire of one-sixteenth inch in diameter.

The construction of my torch may be variously modified without departing from my invention. In the drawing, a right-hand torch has been illustrated, that is, a torch that is to be held in the right hand of the operator when performing a welding operation. In this torch the wire guide 4 has been illustrated on the leading side of the torch and feeds the filler wire in ahead of the arc as the torch is moved along the work to make the weld. The electrode may, however, be fed in from the sides or back of the arc but I find it preferable to feed it in ahead of the arc. The enclosure 5 for the right-hand torch shown in Fig. 1 may conveniently be so arranged that the portion projecting above the torch handle and including shaft 9 of the feeding mechanism is located below the torch thereby affording greater clearance between this enclosure and the wrist of the operator's hand by which the torch is held. With the size of the parts as illustrated in the drawing, this has not been necessary, although it is still a preferable arrangement. The speed adjusting means 27 of the speed control for the feed motor should also be placed as illustrated so as to be in a position which will interfere least with the operator's welding arm and so that it is readily accessible for manipulation by the free hand of the operator during the wlding operation. It may be so located on the torch handle that it is operable by the thumb and forefinger of the hand by which the torch is held so as to leave the other hand of the operator completely free. The feeding mechanism and the wire guide may also be further modified so that a major portion thereof is enclosed within the handle of the welding torch from which the front end of the wire guide emerges at the front end of the torch to provide the head arrangement illustrated in the drawing wherein the wire guide is exterior to the nozzle structure and spaced therefrom. The feeding mechanism may be operated by a mechanically driven motor, such as an air motor, and the speed control may be partly mechanical and of the governor type or fully electrical and of a type other than that above described by way of example. The speed adjusting element 27 which is mounted on the torch may be a rheostat in the field circuit of a direct current shunt motor drive. Furthermore, a vibrating electromagnetic drive may be wholly located on the handle of the torch provided feeding increments are sufficiently small to produce a substantially constant rate of wire feed.

These and other modifications will occur to those skilled in the art, and I therefore intend to cover by the appended claims all such modifications of my invention as fall within the true spirit and scope thereof.

What I claim as new and desire to secure by Letters Patent of the United States is:

1. A hand torch for use in welding operations in which a filler wire is fused and added to the weld metal at the point of welding, said torch comprising a handle, a nozzle angularly disposed on the front end portion of said handle, means extending lengthwise of said handle for establishing a heating agency at the tip of said nozzle, flexible connections extending from the rear end of said handle to said last mentioned means from a supply means located remotely from said torch, an enclosure mounted on the rear end of said handle beyond the hand grip portion thereof, a wire feeding mechanism in said enclosure and having a drive shaft extending from said enclosure, a motor supported at a point remote from said torch and having a rotatable shaft, a flexible shaft one end of which is connected to said drive shaft of said feeding mechanism and the other end of which is connected to said shaft of said motor, a flexible wire guide extending from said enclosure and said feeding mechanism therein to a supply of filler wire located remotely from said torch, and a wire guide extending along said torch from said enclosure and said feeding mechanism therein to the tip portion of said nozzle, said wire guide conforming to the contour of said torch and having a delivery end portion extending along the outside of said nozzle and terminating in a curved end which is turned inwardly toward the center of the tip portion of said nozzle.

2. A hand torch for use in welding operations in which a filler wire is fused and added to the weld metal at the point of welding, said torch comprising a handle, a nozzle angularly disposed on the front end portion of said handle, means extending lengthwise of said handle for establishing a heating agency at the tip of said nozzle, flexible connections extending from the rear end of said handle to said last mentioned means from a supply means located remotely from said torch, an enclosure mounted on the rear end of said handle beyond the hand grip portion thereof, a wire feeding mechanism in said enclosure and having a drive shaft extending from said enclosure, a motor supported at a point remote from said torch and having a rotatable shaft, a flexible shaft one end of which is connected to said drive shaft of said feeding mechanism and the other end of which is connected to said shaft of said motor, a speed controller acting on said motor and having a light weight adjusting means mounted on said torch and connected by flexible members with the remainder thereof which is mounted remotely from said torch, a wire guide extending from said enclosure and the feeding mechanism therein to the tip portion of said nozzle, said wire guide conforming to the contour of said torch and having a delivery end portion extending along the outside of said nozzle and terminating in a curved end which is turned inwardly toward the center of the tip portion of said nozzle.

3. A hand torch for use in welding operations in which a filler wire is fused and added to the weld metal at the point of welding, said torch comprising a handle, a nozzle angularly disposed on the front end portion of said handle, means extending lengthwise of said handle for establishing a heating agency at the tip of said nozzle, flexible connections extending from the rear end of said handle to said last mentioned means from a supply means located remotely from said torch, an enclosure mounted on the rear end of said handle beyond the hand grip portion thereof, a wire feeding mechanism in said enclosure and having a drive shaft extending from said enclosure, a motor supported at a point remote from said torch and having a rotatable shaft, a flexible drive shaft one end of which is connected to said drive shaft of said feeding mechanism and the other end of which is connected to said shaft of said motor, a flexible wire guide extending from said enclosure and said feeding mechanism therein to a supply of filler wire located remotely from said torch, and a wire guide extending along said handle and said nozzle from said enclosure and said feeding mechanism therein, said wire guide being curved in one plane to conform to the angle between said handle and said nozzle and being curved in a plane substantially at right angles to the plane of said first mentioned curve to form a discharge end portion turned inwardly toward the center of the tip portion of said nozzle.

4. A hand torch for use in welding operations in which a filler wire is fused and added to the weld metal at the point of welding, said torch comprising a handle, a nozzle angularly disposed on the front end portion of said handle, said nozzle having a body portion and a replaceable tip portion mounted on and in heat conductive engagement with the body portion of said nozzle, means for cooling the body portion of said nozzle, said means having a cooling fluid passageway therein, cooling fluid passageways extending lengthwise of said handle from the rear end portion thereof to said passageway in said cooling means, flexible cooling fluid conduits extending from the rear end of said handle and connecting said cooling fluid passageways in said handle to a cooling fluid supply and exhaust located remotely from said torch, means extending lengthwise of said handle for establishing a heating agency at the tip of said nozzle, flexible connections extending from the rear end of said handle to said last mentioned means from a supply means located remotely from said torch, an enclosure forming part of said torch, a wire feeding mechanism in said enclosure and having a drive shaft extending from said enclosure, a motor supported at a point remote from said torch and having a rotatable shaft, a flexible drive shaft extending from the rear end of said handle and having one end thereof connected to said drive shaft of said feeding mechanism and the other end thereof connected to said shaft of said motor, a flexible wire guide extending from the rear end of said handle to a supply of filler wire located remotely from said torch, means for connecting one end of said flexible wire guide with said enclosure and for directing filler wire from said flexible wire guide to said feeding mechanism in said enclosure, a second wire guide extending from said enclosure and said feeding mechanism therein along the outside of the body portion of said nozzle to a point adjacent said tip portion thereof, a wire deflecting member of heat conducting material mounted on and in heat conductive engagement with said tip portion of said nozzle and having a discharge end directed inwardly toward the center of said tip portion of said nozzle at a point beyond the end thereof, and a separable coupling between said second wire guide and said wire deflecting member.

5. A hand torch for use in welding operations in which a filler wire is fused and added to the weld metal at the point of welding, said torch comprising a handle, a nozzle angularly disposed on the front end portion of said handle, said nozzle having a body portion with a cooling fluid passageway therein and having a replaceable tip portion mounted on and in heat conductive engagement with the body portion of said nozzle, cooling fluid passageways extending lengthwise of said handle from the rear end portion thereof to said passageway in said nozzle, flexible cooling fluid conduits extending from the rear end of said handle and connecting said cooling fluid passageways in said handle to a cooling fluid supply and exhaust located remotely from said torch, means extending lengthwise of said handle for establishing a heating agency at the tip of said nozzle, flexible connections extending from the rear end of said handle to said last mentioned means from a supply means located remotely from said torch, an enclosure mounted on the rear end of said handle beyond the hand grip portion thereof, a wire feeding mechanism in said enclosure and having a drive shaft extending from said enclosure, a motor supported at a point remote from said torch and having a rotatable shaft, a flexible drive shaft one end of which is connected to said drive shaft of said feeding mechanism and the other end of which is connected to said shaft of said motor, a flexible wire guide extending from said enclosure and said feeding mechanism therein to a supply of filler wire located remotely from said torch, a wire guide conforming to the contour of said torch and extending along said handle and along the outside of the body portion of said nozzle to a point adjacent said tip portion thereof, a wire deflecting member of heat conducting material mounted on and in heat conductive engagement with said tip portion of said nozzle and having a discharge end directed inwardly toward the center of said tip portion of said nozzle at a point beyond the end thereof, and a separable heat-break coupling between said last-mentioned wire guide and said wire deflecting member.

6. A gas-arc hand torch for use in welding operations in which a filler wire is fused and added to the weld at the point of welding, said torch comprising a handle, a nozzle angularly disposed on the front end portion of said handle, said nozzle having a body portion of heat conductive material and a replaceable tip portion of heat conductive material in heat conductive engagement with said body portion, an electrode holder within the body portion of said nozzle and electrically insulated therefrom, said electrode holder positioning an electrode lengthwise of said nozzle with the arcing terminal thereof projecting from the tip portion of said nozzle, cooling fluid passageways extending lengthwise of said handle and about said electrode holder and an internal portion of the body portion of said nozzle, a gas passageway extending lengthwise of said handle and into said nozzle, said passageway having discharge openings supplying gas to the tip portion of said nozzle and about the arcing terminal of the electrode projecting therethrough and supported in said holder, flexible hoses and a flexible electrical conductor extending from the rear end of said handle from remotely located sources of cooling fluid, gas, and electricity, said hoses and conductor being connected respectively with said cooling fluid passageways and said gas passageway in said handle and with said electrode holder in said nozzle, an enclosure mounted on the rear end of said handle beyond the hand grip portion thereof, a wire feeding mechanism in said enclosure and having a drive shaft extending from said enclosure, a motor supported at a point remote from said torch and having a rotatable shaft, a flexible drive shaft one end of which is connected to said drive shaft of said feeding mechanism and the other end of which is connected to said shaft of said motor, a flexible wire guide extending from the rear end of said enclosure and said feeding mechanism therein to a supply of filler wire located remotely from said torch, a wire guide extending from said enclosure and said feeding mechanism therein along said handle and the outside of the body portion of said nozzle to a point adjacent the tip portion of said nozzle, a wire deflecting member of heat conducting material mounted on and in heat conductive engagement with said tip portion of said nozzle and having its discharge end directed inwardly toward the center of said tip portion of said nozzle to a point adjacent the arcing tip of an electrode mounted within said holder in said nozzle, and a separable heat-break coupling between said last mentioned wire guide and said deflecting member.

7. A gas-arc hand torch for use in welding operations in which a filler wire is fused and added to the weld metal at the point of welding, said torch comprising a handle, a nozzle angularly disposed on the front end portion of said handle, said nozzle having a body portion of heat conductive material and a replaceable tip portion of heat conducting material in heat conductive engagement with said body portion, an electrode holder within the body portion of said nozzle and electrically-insulated therefrom, said electrode holder positioning an electrode lengthwise of said nozzle with the arcing terminal thereof projecting from the tip portion of said nozzle, cooling fluid passageways extending lengthwise of said handle and about said electrode holder and an internal portion of the body portion of said nozzle, a gas passageway extending through said handle and into said nozzle, said passageway having discharge openings supplying gas to the tip portion of said nozzle and about the arcing terminal of the electrode projecting therethrough and supported in said holder, flexible hoses and a flexible electrical conductor extending from the rear end of said handle from remotely located sources of cooling fluid, gas, and electricity, said hoses and conductor being connected respectively with said cooling fluid passageways in said handle, said gas passageway in said handle and said electrode holder in said nozzle, an enclosure mounted on the rear end of said handle beyond the hand grip portion thereof, a wire feeding mechanism in said enclosure and having a drive shaft extending lengthwise of said handle toward the rear end thereof, a motor supported at a point remote from said torch and having a rotatable shaft, a flexible drive shaft one end of which is connected to said drive shaft of said feeding mechanism and the other end of which is connected to said shaft of said motor, a speed controller acting on said motor and having a light weight adjusting means mounted on said torch and connected by flexible members with the remainder thereof which is mounted remotely from said torch, a flexible wire guide extending from the rear end of said enclosure and said feeding mechanism therein to a supply of filler wire located remotely from said torch, a wire guide extending along said handle and said body portion of said nozzle from said enclosure and said feeding mechanism therein to a point adjacent said tip portion of said nozzle and curved in one plane to conform to the angle between said handle and said nozzle, a wire deflecting member of heat conducting material mounted on and in heat conductive engagement with said tip portion of said nozzle and having a curved portion located in a plane substantially at right angles to said plane of said curve in said last mentioned wire guide, the discharge end of said member being directed inwardly toward a point beyond the arcing terminal of the electrode projecting from said nozzle, and a separable heat-break coupling between said last mentioned wire guide and said deflecting member.

KENNETH C. CRAVEN.

REFERENCES CITED

The following references are of record in the file of this patent:

UNITED STATES PATENTS

| Number | Name | Date |
|---|---|---|
| 1,508,701 | Kramer | Sept. 16, 1924 |
| 2,093,881 | Conrad | Sept. 21, 1937 |
| 2,121,693 | Henderson | June 21, 1938 |
| 2,122,194 | Bixby | June 28, 1938 |
| 2,280,879 | Anderson | Apr. 28, 1942 |
| 2,360,160 | Pickhaver | Oct. 10, 1944 |
| 2,405,542 | Wassell | Aug. 6, 1946 |
| 2,438,344 | Meincke | Mar. 23, 1948 |

FOREIGN PATENTS

| Number | Country | Date |
|---|---|---|
| 468,130 | Great Britain | June 29, 1937 |
| 765,628 | France | Mar. 26, 1934 |